United States Patent
Kuth

(10) Patent No.: US 7,251,676 B2
(45) Date of Patent: Jul. 31, 2007

(54) METHOD FOR HANDLING AN INFORMATION ITEM

(75) Inventor: Rainer Kuth, Herzogenaurach (DE)

(73) Assignee: SIEMENS Aktiengesellschaft, Munich (DE)

(*) Notice: Subject to any disclaimer, the term of this patent is extended or adjusted under 35 U.S.C. 154(b) by 621 days.

(21) Appl. No.: 10/025,468

(22) Filed: Dec. 26, 2001

(65) Prior Publication Data

US 2002/0095428 A1 Jul. 18, 2002

(30) Foreign Application Priority Data

Dec. 22, 2000 (DE) .................................. 10064209

(51) Int. Cl.
*G06F 15/16* (2006.01)

(52) U.S. Cl. .................................. 709/205; 709/217

(58) Field of Classification Search ........ 709/204–207, 709/217–219; 705/14
See application file for complete search history.

(56) References Cited

U.S. PATENT DOCUMENTS

| | | | | |
|---|---|---|---|---|
| 5,848,415 | A * | 12/1998 | Guck ........................... | 707/10 |
| 5,850,442 | A * | 12/1998 | Muftic ........................ | 705/65 |
| 5,870,548 | A * | 2/1999 | Nielsen ...................... | 709/206 |
| 5,956,489 | A * | 9/1999 | San Andres et al. ........ | 709/221 |
| 5,987,464 | A * | 11/1999 | Schneider ................... | 707/10 |
| 6,146,026 | A | 11/2000 | Ushiku | |
| 6,154,764 | A * | 11/2000 | Nitta et al. ................. | 709/200 |
| 6,167,435 | A * | 12/2000 | Druckenmiller et al. .... | 709/206 |
| 6,202,058 | B1 * | 3/2001 | Rose et al. .................. | 706/45 |
| 6,275,496 | B1 * | 8/2001 | Burns et al. ................ | 709/217 |
| 6,363,427 | B1 * | 3/2002 | Teibel et al. ................ | 709/227 |
| 6,374,402 | B1 * | 4/2002 | Schmeidler et al. ........ | 709/203 |
| 6,385,620 | B1 * | 5/2002 | Kurzius et al. .............. | 705/1 |
| 6,442,529 | B1 * | 8/2002 | Krishan et al. .............. | 705/14 |
| 6,484,196 | B1 * | 11/2002 | Maurille ..................... | 709/206 |
| 6,487,538 | B1 * | 11/2002 | Gupta et al. ................ | 705/14 |
| 6,493,703 | B1 * | 12/2002 | Knight et al. .............. | 709/206 |
| 6,591,273 | B2 * | 7/2003 | Jenkins et al. ............. | 707/102 |
| 6,618,751 | B1 * | 9/2003 | Challenger et al. ......... | 709/219 |
| 6,901,433 | B2 * | 5/2005 | San Andres et al. ........ | 709/216 |
| 6,904,435 | B2 * | 6/2005 | Jenkins et al. .............. | 707/10 |
| 6,920,478 | B2 * | 7/2005 | Mendiola et al. ........... | 709/219 |
| 6,968,362 | B2 * | 11/2005 | Koch et al. ................. | 709/206 |

(Continued)

OTHER PUBLICATIONS

Rose, Daniel; Bornstein, Jeremy; and Tiene, Kevin, "Message World: A New Approach to Facilitating Asynchronous Group Communication," Proceedings of the 4th International Conference on Information and Knowledge Management, ACM Press, Dec. 1995, pp. 266-273.*

(Continued)

*Primary Examiner*—Bunjob Jaroenchonwanit
*Assistant Examiner*—Victor Lesniewski
(74) *Attorney, Agent, or Firm*—Young & Thompson

(57) ABSTRACT

A method for handling an information item (10) which originates from an information provider, is made available by a service provider and can be called via a communications network (5). The service provider allocates to the information provider an ident code (15) which identifies the information item (10). If the information provider does not sign on at the service provider within a specific time period by transmitting the ident code (15), preferably together with a handling instruction (20, 30, 40) relating to the information item (10), the service provider deletes the information item (10).

20 Claims, 4 Drawing Sheets

Figure 1:
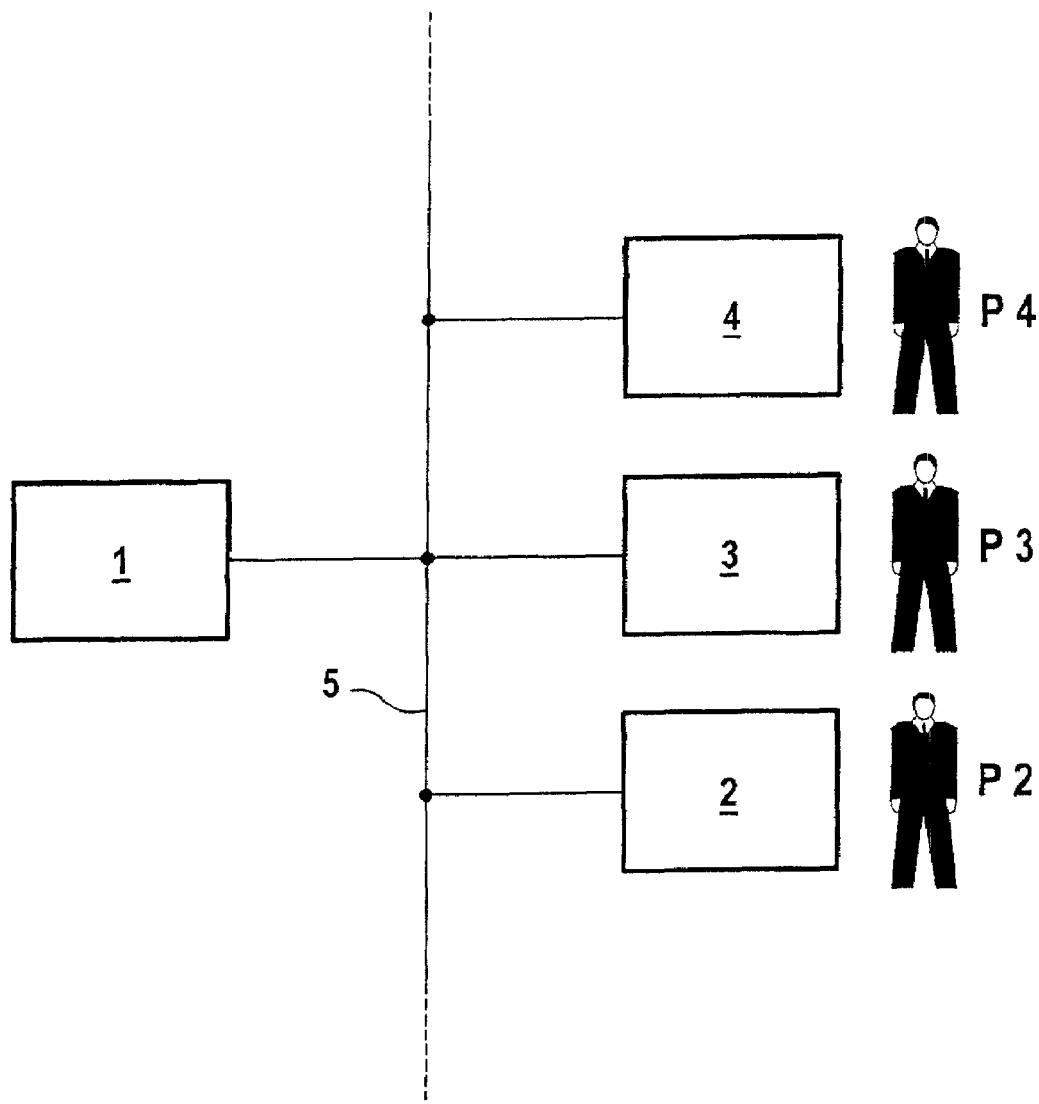

U.S. PATENT DOCUMENTS 6,978,295 B2 * 12/2005 Meifu et al. ............. 709/217
7,113,962 B1 * 9/2006 Kee et al. ................ 707/201

OTHER PUBLICATIONS

Bachmann, David W.; Bauer, Michael A.; Bennett, J. Michael; Fasulo, Guy A.; Kamlet, Michael H.; Klinge, Kevin H.; Makkapati, Sailesh; Slonim, Jacob; and Teorey, Toby J., "Analysis of X.500 Distributed Directory Refresh Strategies," 1991 Conference on the Centre for Advanced Studies on Collaborative Research, IBM Press, Oct. 1991, pp. 277-298.*

Leichsenring, Germano; Sumiya, Kazutoshi; and Uehara, Kuniaki, "A Location-Aware Graphical BBS for Mobile Environments," Proceedings of the 8th ACM International Symposium on Advances in Geographic Information Systems, ACM Press, Nov. 2000, pp. 141-146.*

Textilrecycling im Internet, Walter Recycling GmbH, 1999.

* cited by examiner

METHOD FOR HANDLING AN INFORMATION ITEM

The invention relates to a method for handling an information item which originates from an information provider, is made available by a service provider and can be called via a communications network.

Such items of information which are made available are usually found, for example, on what are referred to as message boards of Internet servers, which can be called from an Internet-capable PC at an Internet address. People who call the Internet address of the message boards from an Internet-capable PC can optionally leave behind information, for example in the form of advertisements, which can be read by other people calling the message boards. Server operators make use of this forum of information exchange as an incentive to visit their Internet homepage. Furthermore, this forum provides the server operators with the possibility of evaluating the information left behind for statistical purposes, and if appropriate of drawing conclusions which can be used for business purposes.

However, a problem with the information forum of message boards is the up-to-dateness of the information made available there. The information is generally sorted according to the input date, but to what extent the information is still current is usually not apparent to a person calling the message boards.

The invention is therefore based on the object of disclosing a method of the type mentioned at the beginning in such a way that the up-to-dateness of information items which originates from information providers and is made available by a service provider and can be called via a communications network is improved.

According to the invention, this object is achieved by a method for handling an information item which originates from an information provider, is made available by a service provider and can be called via a communications network, in which method the information provider, that is to say generally a person calling the homepage of the service provider, receives an identifying the information, before, during or after the transmission of the information to the service provider, which ident code can be, for example, a sequence of numbers. Then, the service provider makes available the information item in a form which can be called on a server, which is understood as being the service provider's computer which is provided with an Internet connection. Preferably, at the same time, over a specific time period, monitoring begins to determine whether the information provider transmits the ident code to the service provider within the time period. If this is not the case, the information item is deleted after the expiry of the time period. In this way, it is ensured that the information items made available by the service provider are highly up-to-date, since, if an information provider has an interest in his information continuing to be accessible to a wide audience, the information provider must indicate the up-to-dateness of his information to the service provider in order to prevent his information items being deleted.

If, according to variants of the invention, the information provider transmits the ident code together with a handling instruction relating to the information assigned to the ident code, the service provider handles the information in accordance with the handling instruction of the information provider. According to a further variant of the invention, handling instructions comprise changing the information in terms of its content, retaining the information in terms of its content or deleting the information. In this way, the information provider is directly provided with the possibility of influencing the content of the information made available and the time period for which the information is made available.

Particularly preferred embodiments of the invention provide the possibility of the information provider or the service provider predetermining the monitoring time period and provide for the monitoring of the time period to take place automatically. The server of the service provider is preferably provided with a program which calculates the predeterminable time period for which the information is made available, as a function of the allocation of an ident code for an information item. Such a time period can comprise, for example, a week or a month, the information being deleted, as already mentioned, after the time period passes if activities to retain the message are not carried out in time by the information provider.

A particularly preferred embodiment of the invention provides for the communications network via which the information can be called to be the Internet. According to a further variant of the information, the ident code is transmitted to the information provider by e-mail. In the same way, there is provision for the ident code to be transmitted, together with the handling instruction relating to the information, to the service provider by e-mail. Accordingly, the information provider and the service provider easily communicate via the same communications network via which the information can be called.

According to a particularly preferred embodiment of the invention, the information made available additionally includes the last update date of the information so that a person using the information forum can immediately recognize the up-to-dateness of the information.

Figure 2:
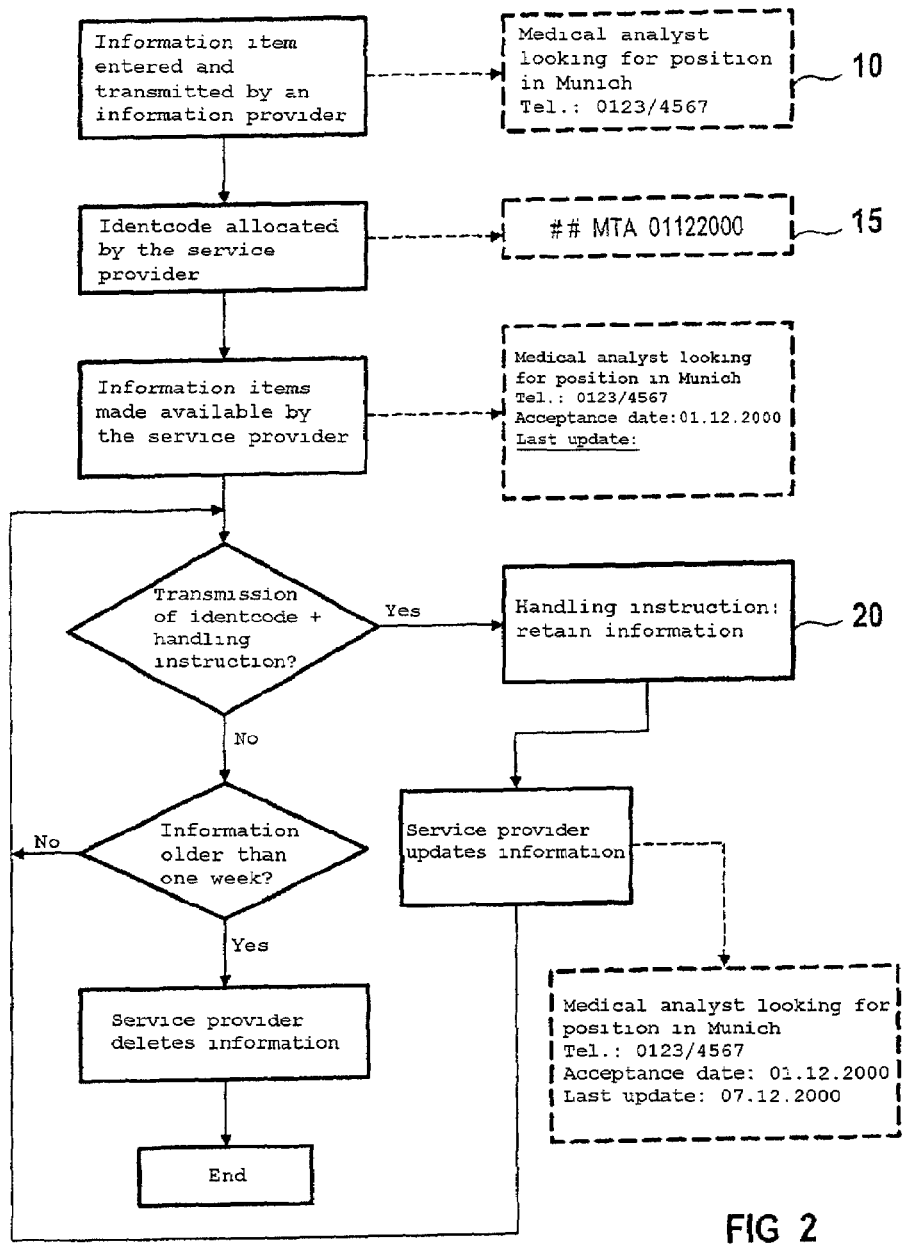
Figure 3:
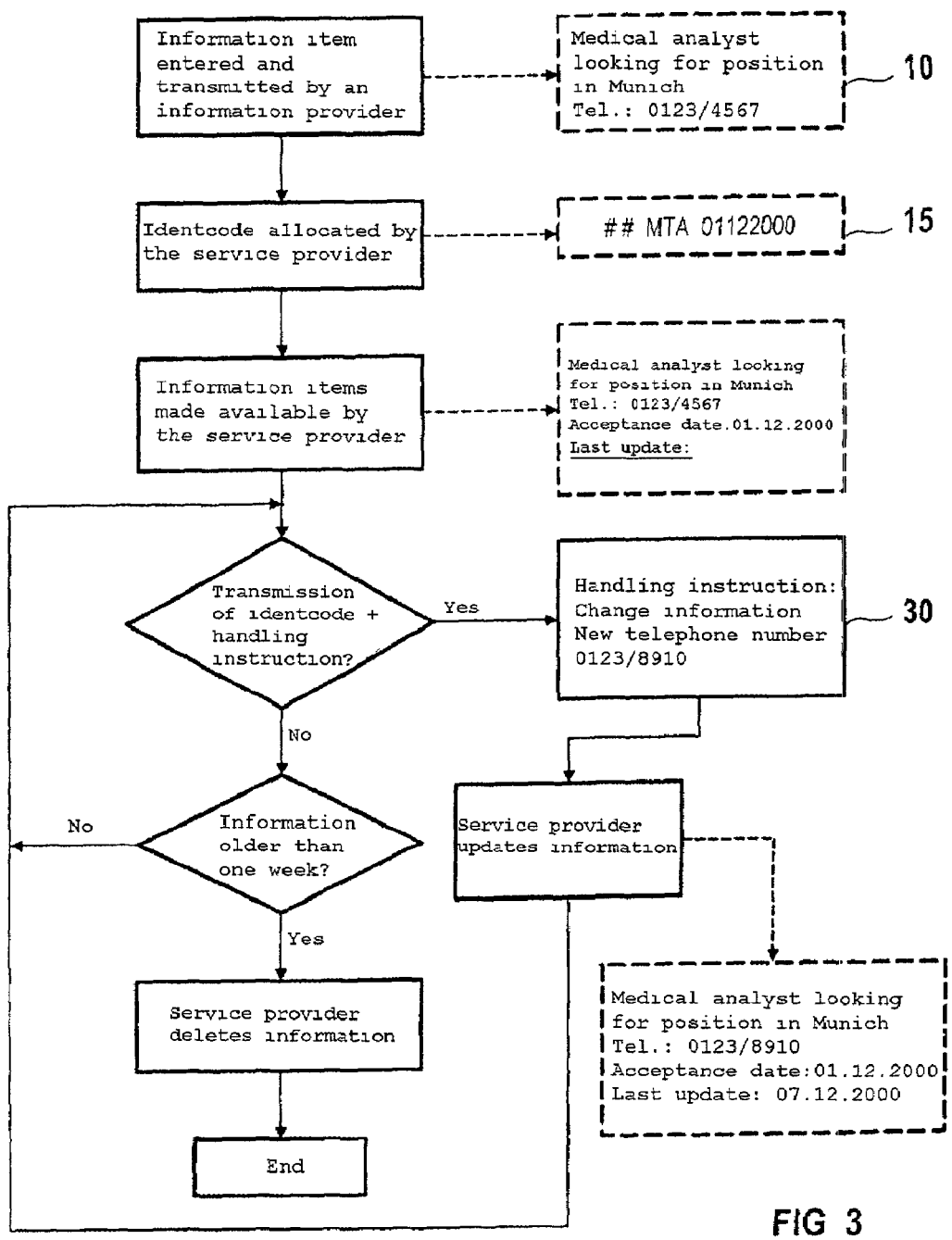
Figure 4:
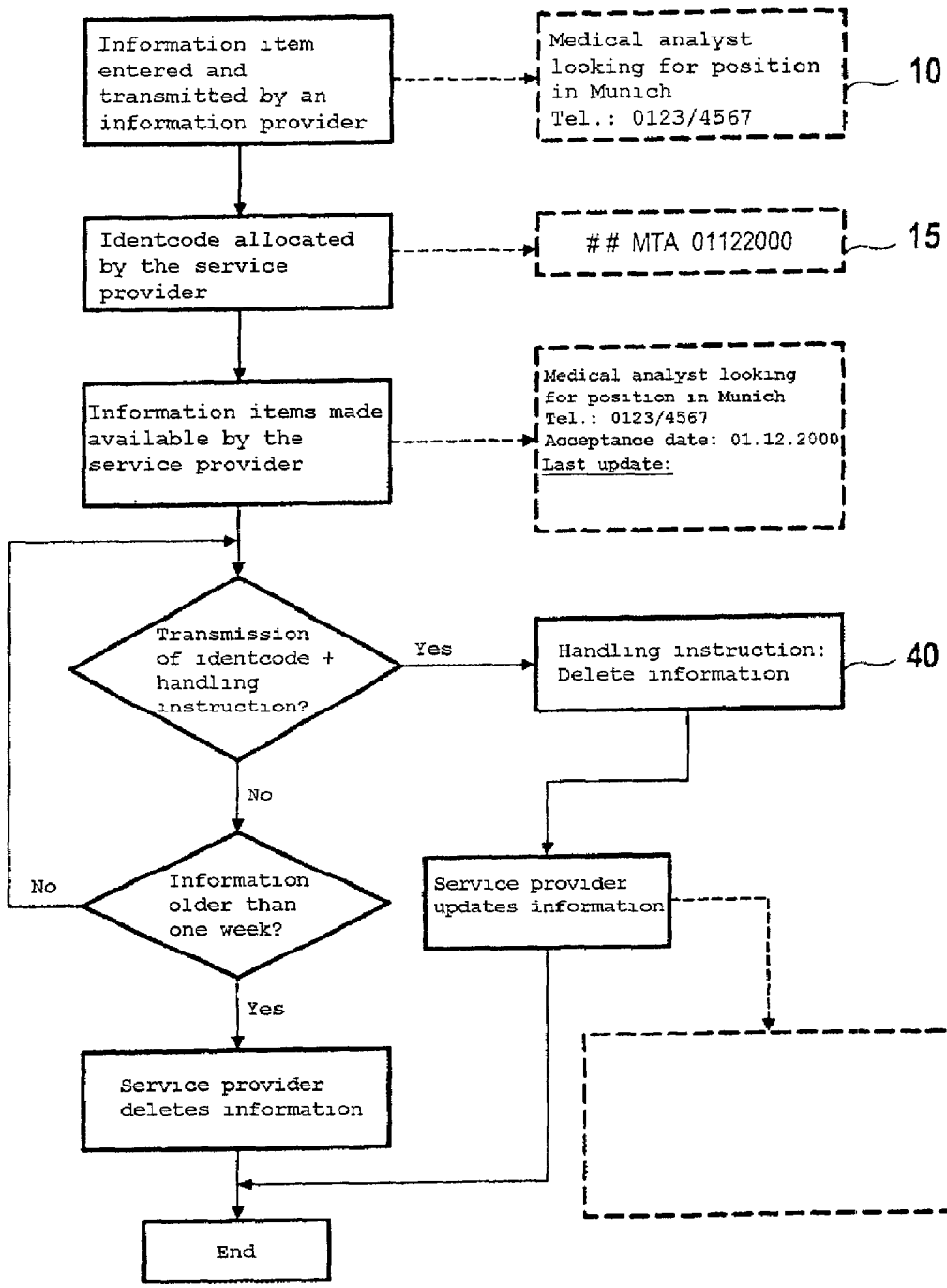

An example according to the invention is illustrated in the appended schematic drawings in which:

FIG. 1 shows a communications system for carrying out the method for handling information items, and FIGS. 2 to 4 show flowcharts for the method for handling information items.

In the case of the present exemplary embodiment, the communications system shown in FIG. 1 comprises a server 1 which is assigned to a service provider, which is a computer, known per se, for providing information, and three PCs 2 to 4 assigned to three different people P2 to P4. Server 1 and the PCs 2 to 4 are arranged spatially separately from one another, but are connected to one another via a communications network 5 in such a way that data can be exchanged via the communications network 5. In the case of the present exemplary embodiment, the communications network is the Internet.

The service provider makes available, in a fashion known per se, what is referred to as a homepage using the server 1, which homepage can be called via the communications network 5 using the Internet address assigned to the homepage, and which homepage contains specific information items which relate to one or more subjects and which are determined and compiled by the service provider. In the case of the present exemplary embodiment, the service provider also makes available what is referred to as a message board by means of the server 1, which message board is an Internet page which can also be called, for example from the PCs 2 to 4, by means of a corresponding Internet address or by means of a link which leads from the homepage to the message board. Any people, such as the people P2 to P4, can use a PC, for example by calling a corresponding entry page or entry mask, to place information items, for example in the form of advertisements, on the message board, said information items being made accessible to other people at the Internet address of the message board on the server 1 via the communications network 5.

In order to keep the information items, which can have a considerable scope, on the message board as up-to-date as possible, the system provider uses the method according to the invention which is illustrated by way of example in the flowcharts in FIGS. 2 to 4.

Information is entered and made available in such a way that after the message board is called, for example by the person P2 working on the PC2, an information item 10 is entered by the person P2 and transmitted in file form to the server 1 of the system provider either continuously or after the conclusion of the entry. The server 1 of the system provider preferably automatically allocates here what is referred to as an ident code 15 which is assigned to the information entered by the person P2, which is unambiguous and which can be composed, for example, of any desired sequence of characters, letters or numbers. The ident code 15 can be used to identify the information 10 entered by the person P2. The allocation of the ident code 15 can take place when the entry page or entry mask for the information 10 is called or can take place after the entry of the information 10 is concluded, the person P2 having to receive the ident code 15. However, the ident code 15 can also be allocated in an automated fashion in such a way that the ident code 15 is conveyed to the person P2 by e-mail, for example, which, however, requires the person P2 to leave his e-mail address when entering the information into the entry mask.

After the ident code 15 has been allocated, the system provider makes available the information entered by the person P2 by adding the acceptance date in a way which is accessible for anyone on the message board of the server 1.

Then, an appropriate program is used, preferably automatically, to monitor on the server 1 whether the ident code 15 of the information is transmitted to the server 1, preferably together with a handling instruction, by the information provider, that is to say by the person P2, within a specific time period, which is a week in the case of the present exemplary embodiment. It is checked daily whether the information originating from the person P2 is older than a week. If it is found that the information has exceeded the deadline of a week and the ident code 15 has not transmitted, preferably together with the communication of a handling instruction, to the service provider by the person P2, the availability of the information originating from the person P2 is automatically terminated, that is to say the information is deleted. The monitoring time period can preferably be predetermined here by the information provider or the service provider, the service provider generally predefining a maximum time period.

If, on the other hand, the person P2 transmits a handling instruction to the service provider together with the ident code 15, which can be done, for example, by e-mail, the service provider acts in accordance with the handling instruction of the person P2. A handling instruction can comprise, for example, changing the content of the information, retaining the content of the information or deleting the information. In the flowchart illustrated in FIG. 2, the person P2 has communicated the handling instruction 20 to the service provider together with the ident code 15 before the expiry of the deadline of a week, after which the information is to be retained. Accordingly, the service provider continues to make available the information originating from the person P2 on the message board, but with the addition of the last refresh date, which corresponds, in the case of the present exemplary embodiment, to the date when the handling instruction 20 was transmitted by the person P2. The deadline of a week then begins to run again starting from this date.

The sequence of the method shown in FIG. 3 differs from the sequence of the method shown in FIG. 2 in that, within the week, the information provider has transmitted to the service provider a handling instruction 30, together with the ident code 15, said handling instruction 30 requesting a change in the information, which in the case of the present exemplary embodiment comprises changing the specified telephone number. This change is performed by the service provider, who makes available the changed information on the message board, the deadline of a week also beginning to run again in this case after the request to change the information has been transmitted.

FIG. 4 shows a third alternative procedure in which the information provider, that is to say the person P2, informs, within the week, the system provider in the form of a handling instruction 40 that the information is not to be made available any more, in response to which the system provider deletes the information from the message board.

The procedures which were illustrated in FIGS. 2 and 3 and relate to the handling instructions 20 and 30 can be run through repeatedly in succession or alternately until the deadline of a week is exceeded as a result of failure of an appropriate handling instruction to be received, or the handling instruction 40 is issued in accordance with FIG. 4.

In the simplest form of embodiment of the invention, it is also possible for merely the transmission of the ident code 15 in time to be sufficient for the information to be retained, by corresponding agreement between the information provider and the service provider, so that it would not be necessary to add an explicit handling instruction to the ident code 15 for this purpose.

It therefore becomes clear that the information made available by a system provider, for example on a message board, can always be kept up-to-date by means of the method according to the invention, resulting in a considerable improvement in quality of such information forums.

The method according to the invention has been described above with reference to the example of a communications system which has PCs. However, instead of a PC, any other suitable computer can also be part of the communications system.

Furthermore, the ident code does not necessarily need to be conveyed to the information provider by e-mail. If expedient, it can also be transmitted by means of a telephone device, for example the telephone, a fax or by other suitable means for transmitting information. Likewise, the ident code does not necessarily need to be conveyed, together with the handling instruction relating to the information, to the service provider by e-mail, but rather can also be conveyed by a telephone device, for example a telephone, or a fax or by other suitable means for transmitting information.

The communications network does not necessarily need to be a public communications network. Instead, the communications network can also be a company-internal Intranet.

Moreover, the invention is not restricted to the handling of information items which are made available on message boards, but can be applied to any form in which an information item originating from an information provider can be made available by a service provider.

The invention claimed is:

1. A method for handling an information item (10) which originates from an information provider, is made available by a service provider and can be called via a communications network, comprising the following method steps:
   a) having the service provider allocate an ident code (15) which identifies the information item (10) to the information provider;
   b) transferring the information item (10) from the information provider to the service provider, and making the transferred information item (10) publicly accessible at an identified address on the communication network;
   c) determining whether the ident code (15) has been transmitted to the service provider by the information provider within a monitoring period, deleting the information item from the service provider if the ident code has not been transmitted, and resetting the monitoring period and repeating step c) if the ident code has been transmitted to the service provider by the information provider;
   wherein the ident code is different from the identified address on the communication network.

2. The method as claimed in claim 1, in which the ident code (15) is transmitted, together with a handling instruction (20, 30, 40) relating to the information item, to the service provider by the information provider.

3. The method as claimed in claim 2, in which, during the transmission of the ident code (15), together with a handling instruction (20, 30, 40), by the information provider, the service provider handles the information item (10) in accordance with the handling instruction (20, 30, 40).

4. The method as claimed in claim 2, in which the handling instruction comprises at least one of changing the information item (30), retaining the information item (20), and deleting the information item (40).

5. The method as claimed in claim 1, in which the monitoring period can be predetermined.

6. The method as claimed in claim 1, in which the monitoring period takes place automatically.

7. The method as claimed in claim 1, in which the communications network (5) is the Internet.

8. The method as claimed in claim 1, in which the ident code (15) is transmitted to the information provider by e-mail.

9. The method as claimed in claim 1, in which the ident code (15) is transmitted, together with the handling instruction (20, 30, 40) relating to the information item, to the service provider by e-mail.

10. The method as claimed in claim 1, in which the information item (10) made available has at least a last update date of the information (10).

11. A method for establishing the currency of an information item that is made generally accessible, comprising the following steps:
    transmitting an information item from an information provider to a service provider;
    transmitting from the service provider to the information provider an ident code;
    making the information item publicly accessible over a communication network through the service provider accessible at an identified address on the communication network;
    monitoring by the service provider to determine whether the information provider has transmitted the ident code to the service provider within a predetermined monitoring period, and deleting the information item from the service provider at a conclusion of the predetermined monitoring period if the information provider has not transmitted the ident code to the service provider within the predetermined monitoring period, and resetting the predetermined monitoring period and repeating the monitoring step is the information provider has transmitted the ident code to the service provider within the predetermined monitoring period;
    wherein the ident code is different from the identified address on the communication network.

12. The method of claim 11, wherein if the service provider receives the ident code from the information provider within the predetermined monitoring period, the service provider resets the predetermined monitoring period and repeats the monitoring step.

13. The method of claim 12, wherein the information provider transmits handling instructions to the service provider in addition to the ident code.

14. The method of claim 13, wherein the handling instructions received by the service provider cause the service provider to perform one of the actions of retaining, modifying, and deleting the information item.

15. A method for handling an information item (10) which originates from an information provider, is made available by a service provider and can be called via a communications network, comprising the following method steps:
    a) having the service provider allocate an ident code (15) which identifies the information item (10) to the information provider;
    b) transferring the information item (10) from the information provider to the service provider, and making the transferred information item (10) publicly accessible at an identified address on the communication network; and
    c) deleting the information item (10) from the service provider if the ident code (15) is not transmitted to the service provider by the information provider within a monitoring period;
    wherein the information item on the service provider is information posted on an internet message board; and
    wherein the ident code is different from the identified address on the communication network.

16. The method as claimed in claim 15, in which the ident code (15) is transmitted, together with a handling instruction (20, 30, 40) relating to the information item, to the service provider by the information provider.

17. The method as claimed in claim 16, in which, during the transmission of the ident code (15), together with a handling instruction (20, 30, 40), by the information provider, the service provider handles the information item (10) in accordance with the handling instruction (20, 30, 40).

18. The method as claimed in claim 16, in which the handling instruction comprises at least one of changing the information item (30), retaining the information item (20), and deleting the information item (40).

19. The method as claimed in claim 15, in which the monitoring period can be predetermined.

20. The method as claimed in claim 15, in which the monitoring period takes place automatically.

* * * * *